United States Patent [19]
Niimi et al.

[11] 3,927,181
[45] Dec. 16, 1975

[54] PROCESS FOR PREPARING HOLLOW BALLS OF SILICON CARBIDE AND PRODUCT FORMED THEREBY

[75] Inventors: Itaru Niimi, Nagoya; Yasuhisa Kaneko, Toyota; Fumiyoshi Noda, Toyota; Yoshihiro Tsuzuki, Toyota, all of Japan

[73] Assignee: Toyota Jidosha Kogyo Kabushiki Kaisha, Toyota, Japan

[22] Filed: June 26, 1973

[21] Appl. No.: 373,876

[30] Foreign Application Priority Data
July 6, 1972 Japan.............................. 47-067784

[52] U.S. Cl.................................. 423/345; 423/439
[51] Int. Cl.²......................................... C01B 31/36
[58] Field of Search ............ 423/345, 439; 252/443; 117/18

[56] References Cited
UNITED STATES PATENTS

| | | | |
|---|---|---|---|
| 1,804,361 | 5/1931 | Marcin................................ | 423/345 |
| 1,930,716 | 10/1933 | Jaeger............................. | 252/443 X |
| 2,918,497 | 12/1959 | Walter............................ | 252/443 X |
| 3,095,316 | 6/1963 | Hartwig........................... | 423/345 X |
| 3,459,504 | 8/1969 | Bracken et al..................... | 423/345 |

*Primary Examiner*—John H. Mack
*Assistant Examiner*—W. I. Solomon
*Attorney, Agent, or Firm*—Brisebois & Kruger

[57] ABSTRACT

A process for preparing hollow balls of silicon carbide, in which the surfaces of hollow balls of carbon are covered with particles of silicon or a silicon-containing composition, and the covered bodies are then heated at a temperature between 1100°C to 1200°C in a non-oxidizing atmosphere.

11 Claims, 3 Drawing Figures

PROCESS FOR PREPARING HOLLOW BALLS OF SILICON CARBIDE AND PRODUCT FORMED THEREBY

BACKGROUND OF THE INVENTION

There are known hollow balls of refractory materials which are prepared from alumina and zirconia by fusing alumina or zirconia at a high temperature and blowing a gas into the fused mass. However, the only hollow balls which can be prepared by this process are those made of materials fusible at a high temperature, so that refractory hollow balls of infusible subliming materials such as silicon carbide and silicon nitride cannot be produced in this manner.

SUMMARY OF THE INVENTION

The object of the present invention is to obtain hollow balls of silicon carbide by covering hollow balls of carbon with metallic silicon or various silicon-containing compositions and heating them to remove the superfluous carbon.

The hollow balls of silicon carbide according to the present invention are quite light in weight due to their hollowness and can therefore be used as lightweight refractory materials having the characteristic properties of silicon carbide.

DETAILED DESCRIPTION OF THE INVENTION

The present invention relates to a process for preparing hollow balls of silicon carbide.

Lightweight refractory materials having a high thermal shock resistance can be obtained from hollow balls of silicon carbide made in accordance with the present invention, since silicon carbide has a lower thermal expansion coefficient, and consequently a higher thermal shock resistance, than alumina or zirconia. The coefficients of thermal expansion of silicon carbide, alumina and zirconia are as follows:

| | |
|---|---|
| Silicon carbide | $4–5 \times 10^{-6}/°C$ |
| Alumina | $8–10 \times 10^{-6}/°C$ |
| Zirconia | $9–10 \times 10^{-6}/°C$ |

Various lightweight metallized products can be prepared from the hollow balls made of silicon carbide in accordance with the present invention and a metal having a good wettability. Furthermore, the hollow balls of silicon carbide can be used as a carrier for a catalyst for cleaning motor car waste gas, since they are light in weight and they have a high resistance to vibration.

The present invention will now be illustrated in detail in the following examples.

EXAMPLE 1

Figure 1:
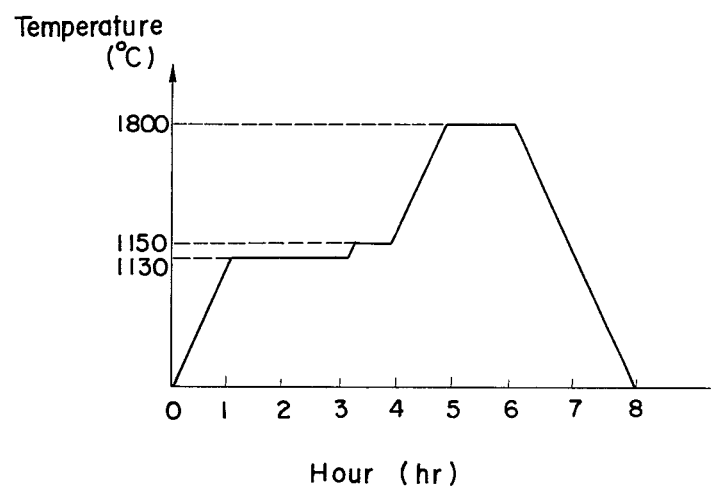
FIG. 1 is a graph showing the relationship between the heating temperature and the heating time during the reaction between the hollow balls of carbon and the silicon particles or the particles of a silicon-containing composition.

A mass comprising 30% by volume of commercial hollow balls of carbon (diameter = about 100 $\mu$) and 70% by volume of metallic silicon of −250 mesh were mixed together in a V-type mixer for 5 hours and the mixture was then placed in a graphite crucible. The crucible was gradually heated to 1130°–1150°C in a vacuum heating furnace, kept at that temperature for 3 hours, and then heated to a temperature of about 1800°C and kept there for 1 hour as shown in FIG. 1.

Figure 2:
FIGS. 2 and 3 are enlarged photographs of the surface of hollow balls of silicon carbide produced by the process described in Example 1.
Figure 3:

After natural cooling in the furnace, hollow balls of silicon carbide were obtained. The surface condition of these hollow balls of silicon carbide is shown by the enlarged photographs in FIG. 2 (magnification = 210) and FIG. 3 (magnification = 700).

The heating at the elevated temperature of 1800°C following the heating at 1130°–1150°C during the heat treatment is for the purpose of increasing the strength of the silicon carbide balls formed, by conversion of the low temperature type silicon carbide formed by the initial heating treatment to high temperature type silicon carbide. While the times of retention at each temperature set forth above yield excellent results, it will be appreciated that the holding times may vary, so long as the period at 1130°–1150°C is long enough to form a silicon carbide ball and the time at 1800°C is long enough to convert this silicon carbide to its stronger form, which is normally at least 1 hour. Furthermore it normally takes about an hour for the temperature within the furnace to reach 1130°C–1150°C and this temperature is normally maintained for 3–4 hours.

EXAMPLE 2

While the specified temperatures yield the most satisfactory results, an acceptable product may also be secured by using a temperature anywhere between 1100°C and 1200°C during the first holding period, and 1400°C and 2000°C during the second holding period.

A mass comprising 30% of commercial hollow balls of carbon (diameter = about 100$\mu$) and 70% of metallic silicon having a diameter below 10$\mu$ were mixed together in a V-type mixer for 5 hours and the mixture was then heat-treated in a vacuum under the heating conditions shown in FIG. 1 in the same manner as in Example 1 to obtain hollow balls of silicon carbide. The surfaces of the hollow balls of silicon carbide produced in this example were smoother than those of Example 1.

EXAMPLE 3

A mass comprising 30% by volume of commercial hollow balls of carbon (diameter = about 100$\mu$) and 70% of metallic silicon having a diameter below 10$\mu$ were mixed together in a V-type mixer for 5 hours and the mixture was then placed in a graphite crucible. The crucible was placed in a vacuum heating furnace and the temperature was raised to 1800°C at a rate of 200°C/hr. The crucible was then kept at 1800°C for 2 hours. After natural cooling in the furnace, hollow balls of silicon carbide were obtained.

These hollow balls of silicon carbide were similar to those obtained in Example 2 but about 50% of the bodies were broken.

EXAMPLE 4

A mass containing 30% of commercial hollow balls of carbon (diameter - 100$\mu$) and 70% of metallic silicon of −250 mesh were mixed together in a V-type mixer for 5 hours and the mixture was then placed in a graphite crucible and heated in an argon atmosphere as shown in FIG. 1 to obtain hollow balls of silicon carbide. The appearance of the hollow balls of silicon carbide produced in this example was similar to that of Example 1.

Furthermore, while argon was used as the inert gas providing a non-oxidizing atmosphere, other insert gases could be substituted.

While in the foregoing examples the carbon bodies have constituted about 30% by volume and the metallic silicon 70%, the exact percentage of carbon bodies is not critical and may range as high as 50%.

EXAMPLE 5

110 cc of an 0.5% aqueous sodium salt of alginic acid and 20 cc of a 1.0% solution of acrylic acid polymer dissolved in acetone were added per 100g of metallic silicon of −400 mesh to obtain 500g of a slurry of metallic silicon having a pH value of 4.7.

150 cc of hollow balls of carbon having a diameter of $100\mu$ were introduced into the slurry which was then stirred thoroughly. The mixture was then placed on a fine wire gauze to remove superfluous slurry and dried at 100°C for 5 hours to obtain hollow balls of carbon coated with metallic silicon. The hollow balls of carbon were subjected to heat treatment as in Example 1 to obtain hollow balls of silicon carbide. Superfluous carbon was removed by subsequent heat treatment at 550°C for 24 hours in air.

The average wall-thickness of the hollow balls of silicon carbide was about $30\mu$.

While certain specific solutions were used as the carrier of the silicon in this example, others may be used.

EXAMPLE 6

Commercial hollow balls of carbon (diameter - about 100 $\mu$) were immersed in a slurry of the same composition as in Example 5 and the slurry then stirred. The mixture was then placed on a fine wire gauze to remove superfluous slurry, dried at 100°C for 5 hours and immersed again in the slurry. After repeating this procedure three times, the mixture was placed on a fine wire gauze to remove superfluous slurry and dried by heating at 100°C for 5 hours to obtain hollow balls of carbon coated with metallic silicon.

The hollow balls of carbon coated with metallic silicon were subjected to heat treatment in the same manner as in Example 1 under the heating conditions shown in FIG. 1, under vacuum, to obtain hollow balls of silicon carbide. After this treatment, superfluous carbon was removed by additional heat treatment at 550°C for 24 hours.

The average wall-thickness of the hollow balls of silicon carbide obtained in this example was $43\mu$.

EXAMPLE 7

Commercial hollow balls of carbon (diameter = about $100\mu$) were immersed in a slurry of the same composition as in Example 5 and the slurry was stirred. Thereafter, the mixture was subjected to drying followed by an immersion-in-slurry treatment five successive times in the same manner as in Example 6 to obtain hollow balls of carbon coated with metallic silicon.

The hollow balls of carbon coated with metallic silicon were mixed with the same volume of carbon powder in a V-type mixer for 5 hours and then the mixture was treated in the same manner as in Example 1 to obtain hollow balls of silicon carbide. The hollow balls of silicon carbide were further subjected to heat treatment at 500°C for 5 hours in air to remove superfluous carbon. The average wall-thickness of the hollow balls of silicon carbide obtained in this example was 106.

EXAMPLE 8

Hollow balls of carbon coated with metallic silicon obtained in the same manner as in Example 2 were heated from room temperature to 1800°C at a rate of 200°C/hr. in an argon atmosphere and kept at that temperature for 2 hours. After natural cooling in the furnace, hollow balls of silicon carbide were obtained.

About 40% of the hollow spherical bodies of silicon carbide produced in this example were broken.

From Examples 3 and 8 it is clear that the balls must be kept for some time at a lower temperature in the 1130°–1150°C range before being heated to 1800°C if breakage is to be avoided.

What is claimed is:

1. A process for preparing hollow balls of silicon carbide which comprises the steps of covering hollow balls of carbon with particles of a material consisting essentially of metallic silicon and then heating the covered bodies in a non-oxidizing atmosphere at a temperature between 1100°C and 1200°C for a time sufficient to form silicon carbide balls from said silicon and carbon.

2. A process for preparing hollow balls of silicon carbide according to claim 1 in which the ratio of the hollow balls of carbon to said particles lies between 3 to 7 and 5 to 5, by volume.

3. A process for preparing hollow balls of silicon carbide according to claim 1 in which said non-oxidizing atmosphere is an inert gas.

4. A process for preparing hollow balls of silicon carbide according to claim 1 in which, during heating, a temperature of 1130°–1150°C is attained after 1 hour and then this temperature is maintained for 3–4 hours, the temperature is then raised to 1800°C, at which level it is maintained for at least 1 hour, after which the balls are allowed to cool naturally.

5. A process for preparing hollow balls of silicon carbide according to claim 1 in which said non-oxidizing atmosphere is a vacuum.

6. A process for preparing hollow balls of silicon carbide which comprises the step of covering hollow balls of carbon with particles of a material selected from the group consisting of silicon and a slurry comprising metallic silicon, an aqueous sodium alginate solution, and an acrylic acid polymer, and then heating the covered balls in a non-oxidizing atmosphere at a temperature between 1100°C and 1200°C for a time sufficient to form silicon carbide balls from said silicon and carbon.

7. A process for preparing hollow balls of silicon carbide according to claim 6 in which the hollow balls of carbon are mixed with said slurry and the resulting mixture is placed on a fine wire gauze to remove superfluous slurry and dried to 100°C for 5 hours to coat the hollow balls of carbon with metallic silicon.

8. A process for preparing hollow balls of silicon carbide which comprises the steps of covering hollow balls of carbon with particles of a material selected from the group consisting of silicon and compositions containing metallic silicon, heating the covered balls in a non-oxidizing atmosphere at a temperature between 1100°C and 1200°C for a time sufficient to form silicon carbide balls from said silicon and carbon, subsequently heating said balls to a higher temperature sufficient to convert said silicon carbide balls to a stronger form of silicon carbide, cooling said balls, and then maintaining them at a temperature of at least 500°C to eliminate superfluous carbon.

9. Hollow balls of silicon carbide obtained by covering hollow balls of carbon with a material cosisting essentially of silicon and then heating the covered bodies in a non-oxidizing atmosphere at a temperature between 1100°C and 1200°C for a time sufficient to form silicon carbide balls from said silicon and carbon.

10. Hollow balls of silicon carbide as claimed in claim 9 comprising hollow balls of carbon and silicon particles at a ratio of 3–5:7–5 by volume respectively.

11. Hollow balls of silicon carbide obtained by covering hollow balls of carbon with a slurry comprising metallic silicon, a solution of an acrylic acid polymer and an aqueous sodium alginate solution, and then heating the covered balls in a non-oxidizing atmosphere at a temperature between 1100°C and 1200°C for a time sufficient to form silicon carbide balls from said silicon and carbide.

* * * * *